United States Patent [19]
Blackburn

[11] 3,891,265
[45] June 24, 1975

[54] FAIRING FOR ATTACHMENT TO THE HANDLEBARS OF A BICYCLE

[76] Inventor: James R. Blackburn, 2071 Rosswood Dr., San Jose, Calif. 95124

[22] Filed: July 1, 1974

[21] Appl. No.: 484,616

[52] U.S. Cl............................... 296/78.1; 280/289
[51] Int. Cl............................................. B62j 17/00
[58] Field of Search.......... 296/78.1, 78 R; 280/289

[56] References Cited
UNITED STATES PATENTS

| | | | |
|---|---|---|---|
| 2,675,266 | 4/1954 | Comiskey | 296/78.1 |
| 3,801,152 | 4/1974 | Tims et al. | 296/78.1 |

FOREIGN PATENTS OR APPLICATIONS

| | | | |
|---|---|---|---|
| 32,259 | 9/1923 | Denmark | 296/78.1 |
| 546,558 | 7/1956 | Italy | 296/78.1 |
| 1,029,770 | 3/1953 | France | 296/78.1 |
| 1,124,902 | 7/1956 | France | 296/78.1 |

*Primary Examiner*—Robert J. Spar
*Assistant Examiner*—Donald W. Underwood
*Attorney, Agent, or Firm*—Schatzel & Hamrick

[57] ABSTRACT

A wind screen fairing for attachment to the handlebars of a bicycle to protect the hands, torso and face of a bicycle rider comprising a sheet comprised of a clear, flexible material and including a top edge and a bottom edge, each aligned in a substantially horizontal direction, and arranged such that a line bisecting the top and bottom edges defines a vertical reference line and a line passing through the sheet intermediate the top and bottom edges and normal to the vertical reference line defines a horizontal reference line, the sheet further including first and second slots, respectively extending along the horizontal reference line from the respective side edges of the sheet inwardly toward one another, and additionally including a first pair of apertures respectively disposed above and below the first slot and a second pair of apertures respectively disposed above and below the second slot, and brackets for aligning the apertures of the first pair and for aligning the apertures of the second pair and for securing the sheet to the handlebars, the respective alignments of the pairs of apertures being operative to produce a cross-curvature of said sheet along the horizontal reference line and the vertical reference line, bowing the sheet into a generally concave configuration.

10 Claims, 3 Drawing Figures

3,891,265

1

FAIRING FOR ATTACHMENT TO THE HANDLEBARS OF A BICYCLE

BACKGROUND OF THE INVENTION

1. Field of the Invention

This invention relates generally to bicycle accessories, and in particular, to a fairing for use on the handlebars of a bicycle which is bowed into a concave shape and which serves to shield the hands, torso and face of a bicycle rider from being impacted by wind.

2. Description of the Prior Art

Today, the number of people participating in bicycling, either as a sport or as a hobby, is rapidly increasing. This increase is attributed to a combination of factors, and has been brought about by both necessity and desire. In one case, the "energy crisis" has caused people to use bicycling as a mode of transportation, since bicycling does not require the use of petroleum and its byproducts. Secondly, an awareness of being physically fit has caused whole families to take to the roads on their bicycles. Thirdly, and partly because of the energy crises and of the awareness of the benefits of being physically fit, millions of dollars are being allocated by federal, state and local governments for bike pathways which tends to encourage bicycle participation. As a consequence of the increased participation, more bicycles are being sold today than ever before. For example, in 1972 over 14 million bicycles were sold worldwide. Of those sold it is estimated that 60–80 percent of the bicycles are of the lightweight, 10-speed, derailer type having dropped handlebars. In view of the increased demand, an abundance of new accessories have been developed for the bicycle industry. However, few if any of these new accessories are designed to improve the comfort of the bicycle rider. The importance of comfort should be obvious once it is recognized that heretofore, bicycles offered no protection against wind, rain and cold.

SUMMARY OF THE PRESENT INVENTION

It is therefore an object of the present invention to provide an apparatus that aids in protecting the bicyclist against wind, rain and cold by reducing the wind chill factor confronting him.

Another object of the present invention is to provide such an apparatus which is easily and inexpensively manufactured.

Still another object is to provide a fairing for attachment to the handlebars of a bicycle which shields the hands, torso and face of the rider.

Briefly, the present invention is directed to a wind screen fairing for attachment to the handlebars of a bicycle to protect the hands, torso and face of a bicycle rider. The fairing is comprised of a sheet of a clear, flexible material that includes a top edge and a bottom edge, each aligned in a substantially horizontal direction, and arranged such that a line bisecting the top and bottom edges defines a vertical reference line and a line passing through the sheet intermediate the top and bottom edges and normal to the vertical reference line defines a horizontal reference line. The sheet further includes first and second slots, respectively extending along the horizontal reference line from the respective side edges of the sheet inwardly toward one another, a first pair of apertures respectively disposed above and below the second slot. Brackets are used to align the apertures of the first pair and the apertures of the second pair and for securing the sheet to the handlebars, the respective alignments of the pairs of apertures being operative to produce a cross-curvature of the sheet along the horizontal reference line and the vertical reference line, bowing the sheet into a generally concave configuration, whereby the fairing provides a smooth outline and serves to protect the body of the bicycle rider.

Among the advantages of the present invention is that the fairing serves to improve the comfort of the bicyclist by shielding his hands, torso and face, and accordingly reduces the chill factor experienced by the rider.

Other advantages of the present invention is that the fairing is relatively inexpensive to purchase, is light weight, is simple in construction, and is easily affixed to the handlebars of the bicycle.

Still another advantage of the present invention is that when the fairing is attached to the handlebars additional effort is not required in pedaling the bicycle. In fact, it is believed that the fairing tends to provide a sail effect when impacted by wind, and accordingly, requires less effort to propel the bicycle.

Other objects and advantages will be apparent to those skilled in the art after having read the following detailed disclosure which makes reference to the several figures of the drawings.

IN THE DRAWING

DETAILED DESCRIPTION OF THE PREFERRED EMBODIMENT

Figure 1:
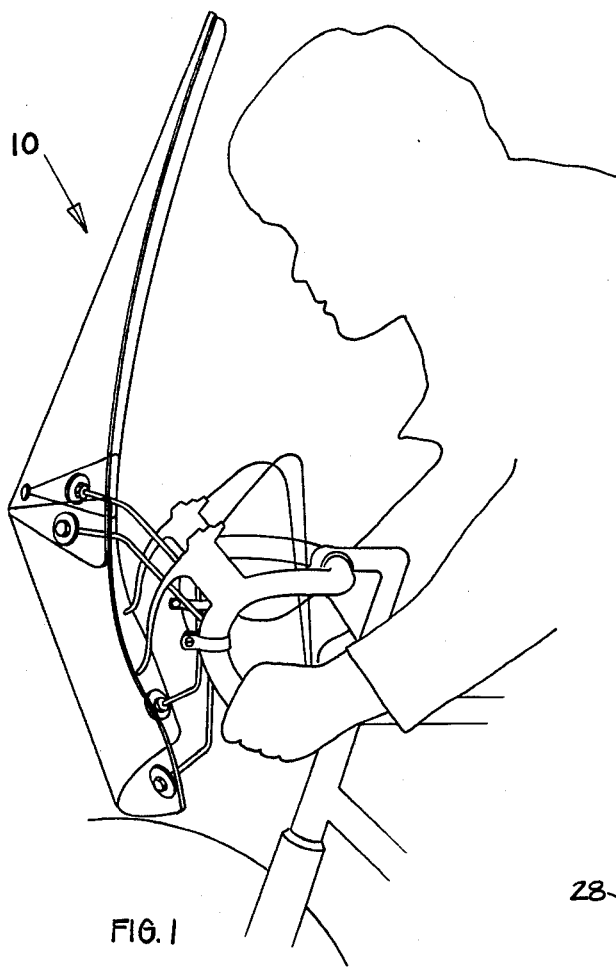
FIG. 1 is a perspective view of the fairing affixed to the dropped handlebars of a bicycle in accordance with the present invention.

Referring now to the drawing and more particularly to FIG. 1 thereof, a fairing, generally illustrated by the numeral 10, is illustrated in perspective view installed on the handlebars of a bicycle. The handlebars are the dropped, curved type and are seen to be symmetrical about their center point. The handlebars are also illustrated in the exploded view of FIG. 3. As previously described, dropped handlebars are well known in the bicycle industry.

Figure 2:
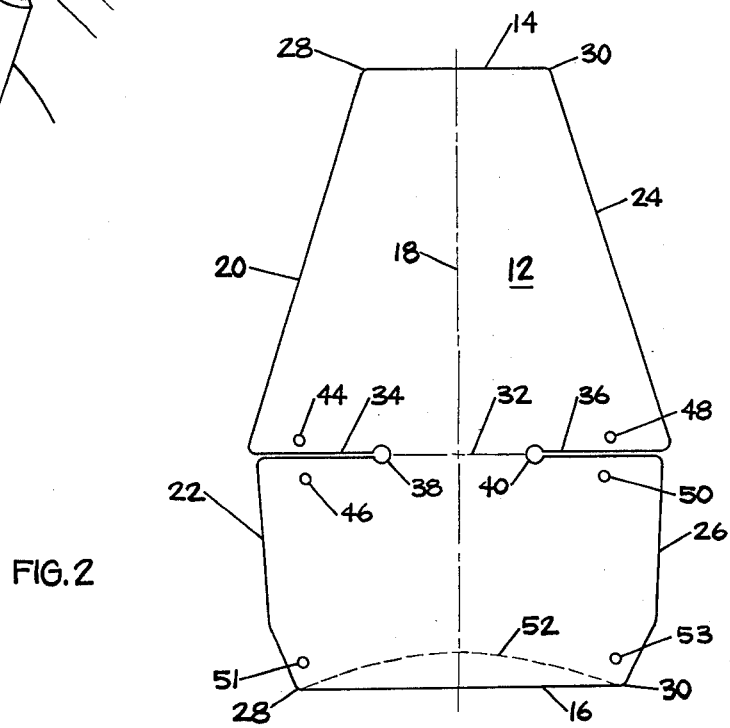
FIG. 2 is a plan view of a sheet of clear, flexible material prior to being formed into a concave shape in accordance with the present invention.

With reference to FIG. 2, a sheet 12, comprised of a clear, flexible material is shown. The sheet 12 is generally hexagonal in shape and includes a top edge 14 and a bottom edge 16 that are substantially parallel to one another and which are aligned in a horizontal direction when the sheet is formed into the fairing as will be subsequently described. The edges 14 and 16 are arranged such that a line 18, which bisects the edges 14 and 16, defines a vertical reference line. The edges 20 and 22, and 24 and 26, respectively, connect corresponding corners of the edges 14 and 16. The length of edges 20 and 24 are equal, as is the length of edges 22 and 26. Thus, a line between the intersection of the edges 20 and 22, and the intersection of the edges 24 and 26 is substantially parallel to the edges 14 and 16, and normal to the vertical reference line 18, so as to define a horizontal reference line 32. At the intersections, the edges are slightly offset to enable the fairing to have a smooth outer surface after bowing. Slots 34 and 36 are formed along the horizontal reference line 32 from the outer periphery of the sheet inwardly toward one another. The slots 34 and 36 are substantially the same length and terminate in relief holes 38 and 40, respectively. The relief holes have a radius that is slightly larger than the distance between the sides of the slot to relieve stresses set up in the sheet. As described, the slots 34 and 36 divide the sheet into upper and lower portions. The thickness of the member is uniform and is preferably about one-eighth of an inch. In addition, the intersections of adjacent edges are rounded as at 28 and 30 for safety.

A pair of apertures 44 and 46 are disposed through the sheet at locations above and below the slot 34. Similarly, a pair of apertures 48 and 50 are disposed through the sheet at locations above and below the slot 36. The apertures are positioned such that the horizontal separation between the apertures 44 and 48 is greater than that between the apertures 46 and 50. Apertures 51 and 53 are disposed through the sheet beneath the apertures 44 and 46, and 48 and 50, respectively, at locations near the intersection of the side 16 near the respective sides 22 and 26. In another embodiment, as shown by the dashed lines 52 in FIG. 2, the bottom surface may be slightly rounded for accommodation on various size bicycle frames.

Figure 3:
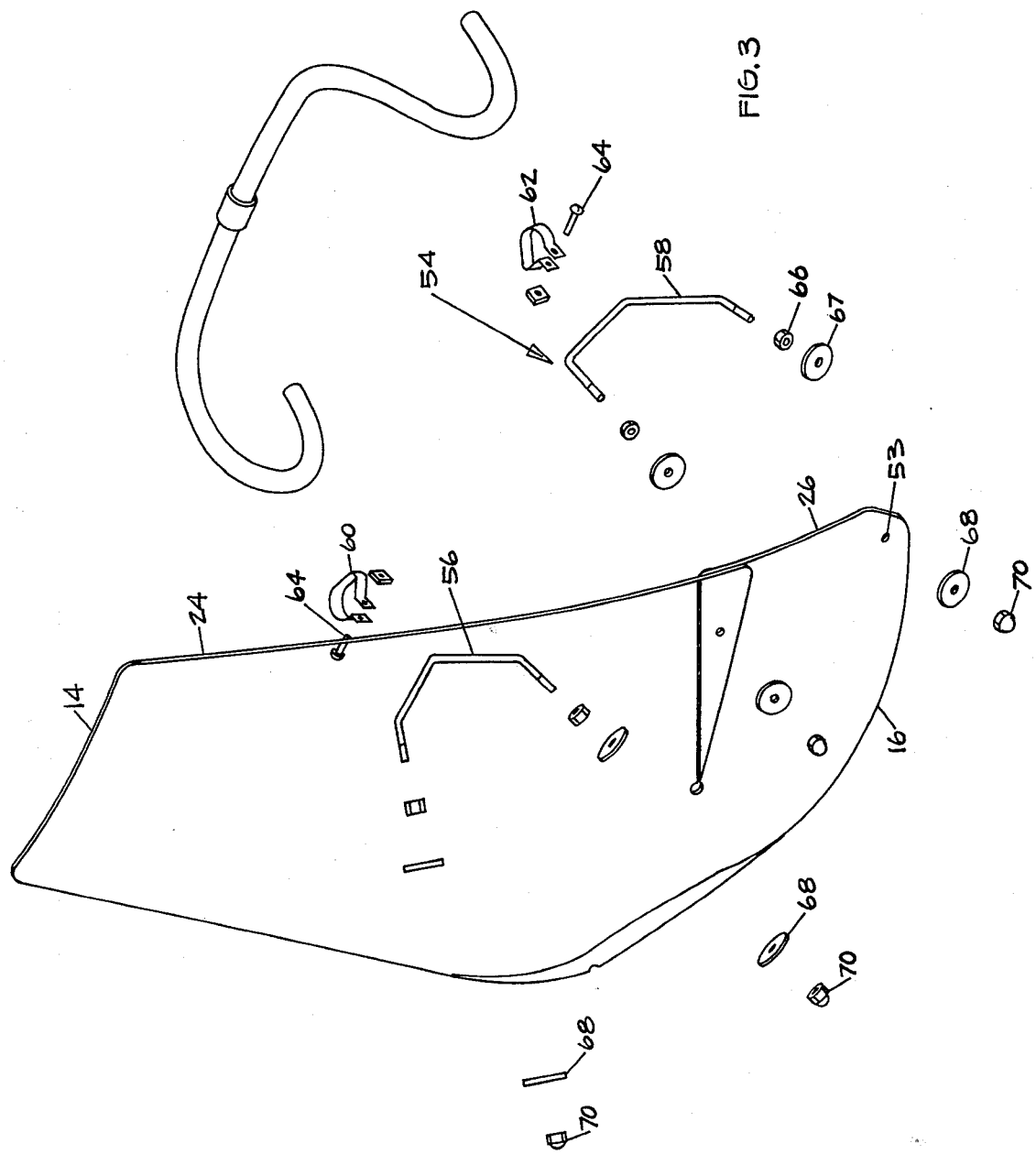
FIG. 3 is an exploded view of the several elements comprising the fairing of the present invention.

Referring now to FIG. 3, the fairing 10 is illustrated in an exploded view. In addition to the sheet 12, the fairing includes mounting means, generally designated by the numeral 54, for aligning the apertures 44 and 46 and for aligning the apertures 48 and 50 and for securing the sheet to the handlebars of the bicycle. The mounting means 54 includes brackets 56 and 58 which are generally C-shaped and which have threaded ends. Clamps 60 and 62, along with the nut and bolt assemblies 64 are provided to affix the brackets to the handlebars. To maintain the alignment of the respective apertures, nuts 66, washers 67 and 68, and acorn nuts 70 are included. The acorn nuts are rounded for safety.

In accordance with the present invention, the upper portion of the sheet is pushed forward of and pulled over the lower portion until the apertures 44 and 48 are respectively aligned over the apertures 46 and 50. In so doing, a cross-curvature is produced along the horizontal reference line 32 and along the vertical reference line 18, thereby bowing the sheet into a generally concave configuration. Thereafter, the nuts 66 and the washers 67 are threaded over the respective ends of the brackets 56 and 58, and the ends of the brackets are inserted through the aligned apertures in the bowed member. The washers 68 and the acorn nuts 70 are threaded over the exposed ends of the brackets to secure the member in the bowed position. Clamps 60 and 62 are used to affix the bowed sheet to spaced-apart points on the handlebars. Preferably, the clamps secure the fairing to the forwardmost portions of the curved dropped handlebars, since experience has shown that these portions of the handlebars are seldom gripped by the bicyclist. Once the brackets are secured to maintain the concave configuration of the bowed sheet, the sheet takes on the character of a fairing. A fairing is defined in *Webster's Seventh New Collegiate Dictionary* as being a member or structure whose primary purpose is to produce a smooth outline and reduce drag.

In the preferred embodiment, the sheet is comprised of butyrate plastic, which is more precisely described as acetate butyrate. The basic ingredients of butyrate plastic are wood pulp and cotton. Thus butyrate is not subject to the same scarcity as are products which are primarily petroleum-based in times of energy crises. In addition, butyrate is advantageously characterized as having a low fracture rate which prevents the fairing from shattering, which could occur, for example, if stones were thrown into the path of the bicycle rider.

In fabricating the sheet, a steel rule die, which is mounted on a wood base, is used. Alternatively, the sheet may be formed by routing. Both of the described methods of fabrication are relatively simple since the step of thermal forming the concave shape into the sheet is eliminated. In addition, since the formed sheets are substantially flat, shipping labor and costs are substantially reduced.

In the preferred embodiment, edge 14 is about 10 inches in width, edge 16 is about 17.5 inches, the height of the member between edges 14 and 16 is about 32 inches, the horizontal reference line 32 is about 12 inches from the side 16, and the vertical reference line 18 is the perpendicular bisector of the edges 14 and 16. The apertures 44, 46, 48, 50, 54 and 56 have a diameter of about 0.3125 inches, and the relief holes 38 and 40 have a diameter of about 0.5 inches. The relief holes are spaced 4 inches from the vertical reference line 18, apertures 46 and 50 are spaced 8 inches from the vertical reference line 18, and apertures 44 and 48 are spaced 8.25 inches from the line 18. The sheet is about one-eighth inches thick. In the bowed state the horizontal reference line is about 3½ inches from the edges 22 and 26.

It has been found that the fairing of the present invention provides a smooth outline and serves to shield the hands, torso and face of the bicycle rider. More specifically, the tapered upper portion shields the face and the upper torso of the rider, the widest portion along the horizontal reference line 32 serves to shield the lower torso and legs of the rider. It should be noted that the fairing does not have to extend below the knees of the bicycle rider since the legs are constantly pedaling and thus are not subject to the same chilling as the torso and since only one leg at a time extends below the lower edge of the fairing.

In addition to shielding the rider, it is believed that the fairing 10 tends to provide a "sail" or "lift" effect when impacted by wind. The term "sail" effect is used in this context to denote the effect observed by placing a wing or airfoil in the path of an airstream. Because of the shape of the wing, the wind has a higher velocity as it flows over its upper curved part and has a lower velocity as it flows across the lower, relatively flat, portion. The difference in velocities tends to provide a lift force on the wing. Similarly, the sail of a sailboat serves to lift the boat in accordance with wind velocity and direction. Analogously, it is believed that the fairing, when attached to the handlebars, provides a lift to the bicycle, and thus requires less effort to propel.

From the above, it can be seen that a fairing has been described which fulfills all of the objects and advantages set forth above.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A wind screen fairing for attachment to the handlebars of a bicycle to protect the hands, torso and face of a bicycle rider, comprising:

a sheet comprised of a clear, flexible material and including a top edge and a bottom edge, each aligned in a substantially horizontal direction, and arranged such that a line bisecting said top and bottom edges defines a vertical reference line and a line passing through said sheet intermediate said top and bottom edges and normal to said vertical reference line defines a horizontal reference line, said sheet further including first and second slots, respectively extending along said horizontal reference line from the respective side edges of said sheet inwardly toward one another, said sheet additionally including a first pair of apertures respectively disposed above and below said first slot and a second pair of apertures respectively disposed above and below said second slot; and mounting means for aligning the apertures of said first pair and for aligning the apertures of said second pair and for securing said sheet to the handlebars, the respective alignments of said pairs of apertures being operative to produce a cross-curvature of said sheet along said horizontal reference line and said vertical reference line, bowing said sheet into a generally concave configuration, whereby said fairing provides a smooth outline and serves to protect the body of the bicycle rider.

2. A wind screen fairing for attachment to the handlebars of a bicycle as recited in claim 1 wherein said sheet further includes a third pair of apertures disposed near said bottom edge for receiving said mounting means and for maintaining said sheet in said generally concave configuration.

3. A wind screen fairing for attachment to the handlebars of a bicycle as recited in claim 2 wherein said top and bottom edges are parallel to one another.

4. A wind screen fairing for attachment to the handlebars of a bicycle as recited in claim 2 and further comprising a relief hole at the innermost surface of said respective slots for relieving stresses set up in said sheet during bowing.

5. A wind screen fairing for attachment to the handlebars of a bicycle as recited in claim 2 wherein said sheet is comprised of butyrate plastic.

6. A wind screen fairing for attachment to the handlebars of a bicycle as recited in claim 5 wherein said butyrate plastic is characterized by having a fracture rate which prevents the fairing from shattering.

7. A wind screen fairing for attachment to the handlebars of a bicycle as recited in claim 2 wherein said mounting means comprises a first bracket which extends through said first pair of apertures and one aperture of said third pair, a second bracket which extends through said second pair of apertures and the other aperture of said third pair, and a pair of clamps for affixing said first and second brackets to the handlebars.

8. A wind screen fairing for attachment to the handlebars of a bicycle as recited in claim 7 and further comprising acorn nuts for securing said brackets to said sheet, said nuts including a substantially smooth outer surface to enhance the safety of said fairing.

9. A wind screen fairing for attachment to the handlebars of a bicycle as recited in claim 2 wherein said apertures of said first and said second pairs that are disposed above said slots are spaced apart a greater distance than those disposed below said slots so as to enhance alignment therebetween.

10. A wind screen fairing for attachment to the handlebars of a bicycle as recited in claim 2 wherein the handlebars are of the dropped curved type and include two forwardmost points, and wherein said mounting means is secured to said forwardmost points so as to enable the rider to assume a forward position over the handlebars.

* * * * *